H. RAMMINGER.
STANCHION.
APPLICATION FILED FEB. 27, 1911.
1,008,492.
Patented Nov. 14, 1911.
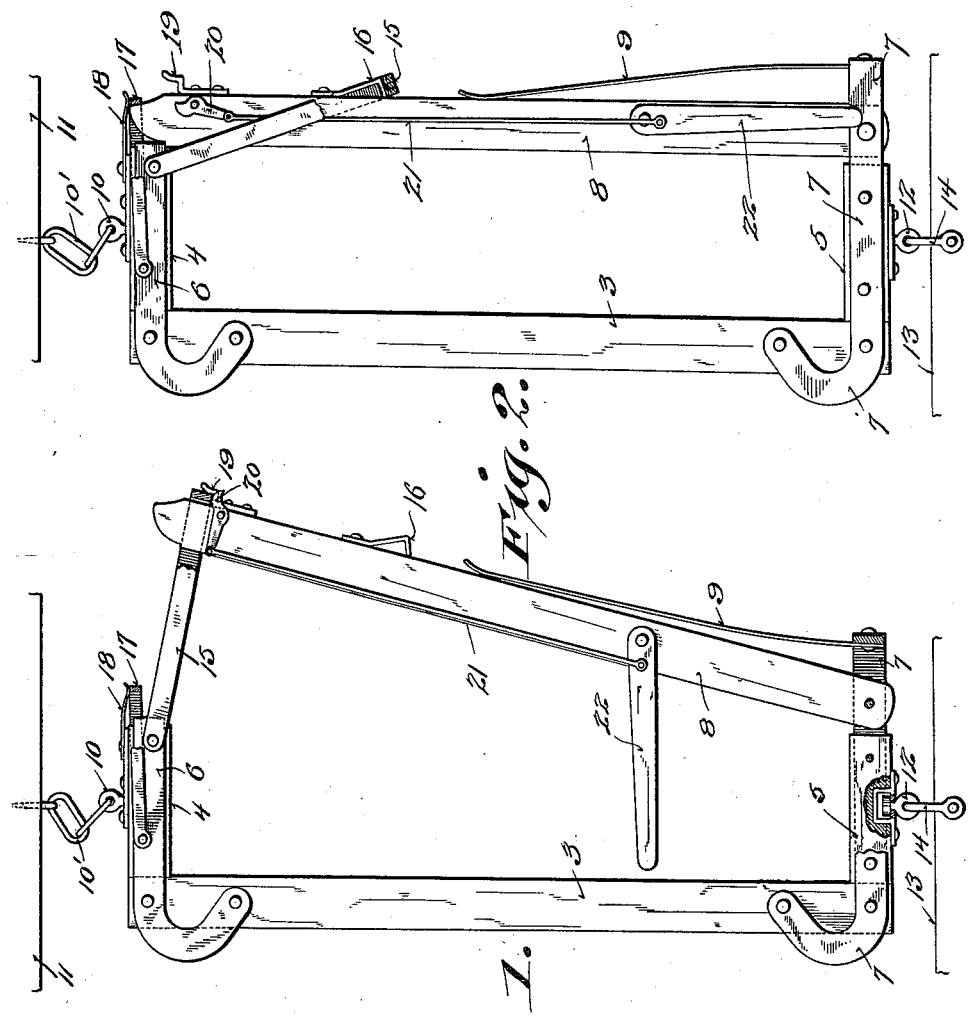

UNITED STATES PATENT OFFICE.

HENRY RAMMINGER, OF NEW HOLSTEIN, WISCONSIN.

STANCHION.

1,008,492.  Specification of Letters Patent.  Patented Nov. 14, 1911.

Application filed February 27, 1911. Serial No. 611,019.

*To all whom it may concern:*

Be it known that I, HENRY RAMMINGER, a citizen of the United States, and resident of New Holstein, in the county of Calumet and State of Wisconsin, have invented certain new and useful Improvements in Stanchions; and I do hereby declare that the following is a full, clear, and exact description thereof.

My invention consists in what is herein particularly set forth with reference to the accompanying drawings and pointed out in the claim of this specification, its object being to provide simple, economical stanchions in which provision is had for locking a swing-post of each in position to permit an animal to engage the stanchion, as well as for animal release of said post from the position aforesaid, its automatic return to securing position and automatic locking of the same in the latter position.

Figure 1 of the drawings represents a rear elevation of a stanchion in accordance with my invention partly broken away, its swing-post being locked out of animal securing position, and Fig. 2, a similar view of the stanchion having said swing-post thereof locked in animal securing position.

Referring by numerals to the drawings 3 indicates the fixed post, 4 the top rail and 5 the bottom rail of my improved stanchion, these parts being ordinarily of wood held together in connection with strap-iron brace-loops 6 and 7 riveted or otherwise suitably secured thereto. Pivotally connected at its lower end to the loop 7, within the same outward from the bottom rail 5, is a swing-post 8 opposed by a flat spring 9 that is fastened to said loop. Fast on the top rail of the stanchion is an eye-fixture 10 engaged by a suspending chain 10' attachable to an overhead beam 11 and the bottom rail of said stanchion is provided with a swivel-fixture 12 for connection with a support 13, by means of a swing-staple 14 or otherwise as may be convenient or desirable, these suspending and swivel fixtures being usual in the art.

Pivotally connected to the upper brace-loop 6 are the ends of a gravity-bow 15 engaged by the swing-post 8, and this post is provided with a latch 16 for said bow. Another bow 17 has its ends pivotally connected to the top rail of the stanchion under a flat spring 18 in contact therewith, this spring being fastened to said rail. The swing-post is provided with an upper keeper 19 for the bow 15, and a bow-tripper 20 is pivotally connected to said post. A link rod 21 is connected at its ends to the tripper 20 and to a lever 22 which lever is pivotally connected to the swing-post, and the upper end of this post is fashioned, substantially as herein shown, to automatically engage the spring-controlled bow, as well as to lap under the top-rail of the stanchion when said post is in animal securing position, where it is locked by said bow and the other bow 15 that drops under the latch 16 aforesaid. The swing-post being freed from the bow 17 and swung into the position shown in Fig. 1, against resistance of the spring 18, the lever 22 is lifted to horizontal position to likewise set the tripper 20, and the bow 15 is caught in the keeper 19 under said tripper, the stanchion being now open for the engagement therewith of an animal to be secured. The animal entering the stanchion and dropping its head to feed will, by its neck, depress the lever 22 thereby effecting an operation of the tripper 20 to lift the bow 15 out of the keeper 19, thus permitting the spring 9 by its contraction to force the swing-post into the animal securing position shown in Fig. 2, where it is automatically locked by the aforesaid bows as above described, the bow 15 being caught under the latch 16.

I claim:

A stanchion comprising a fixed post, top rail, bottom rail and spring-controlled swing-post; a gravity bow pivotally connected to the top rail and in which the swing-post has play, a bow-latch, bow-keeper, a pivotal bow-tripper and a lever in connection with the swing-post; means connecting said tripper and lever, and a spring-controlled bow pivotally connected to said top rail to be automatically engaged by said swing-post on throw of the same to animal securing position.

In testimony that I claim the foregoing I have hereunto set my hand at New Holstein in the county of Calumet and State of Wisconsin in the presence of two witnesses.

HENRY RAMMINGER.

Witnesses:
 H. H. GREVE,
 WM. REE.